United States Patent [19]

Nozue et al.

[11] Patent Number: 4,522,513
[45] Date of Patent: Jun. 11, 1985

[54] TAPERED-LAND THRUST BEARING DEVICE

[75] Inventors: Shigehiro Nozue, Toyota; Tatsuhiko Fukuoka, Aichi, both of Japan

[73] Assignee: Taiho Kogyo Co., Ltd., Aichi, Japan

[21] Appl. No.: 479,313

[22] Filed: Mar. 28, 1983

[30] Foreign Application Priority Data

Mar. 27, 1982 [JP] Japan .................................. 57-48112

[51] Int. Cl.$^3$ ............................................. F16C 17/04
[52] U.S. Cl. .................................................... 384/368
[58] Field of Search ............... 384/369, 123, 112, 368, 384/420, 121

[56] References Cited

U.S. PATENT DOCUMENTS

| | | | |
|---|---|---|---|
| 2,402,377 | 6/1946 | Davenport | 384/369 |
| 3,913,989 | 10/1975 | Williams | 384/123 |
| 4,326,758 | 4/1982 | Nozue et al. | 308/170 |
| 4,383,771 | 5/1983 | Freytag et al. | 384/123 |

Primary Examiner—Lenard A. Footland
Attorney, Agent, or Firm—Armstrong, Nikaido, Marmelstein & Kubovcik

[57] ABSTRACT

A tapered-land thrust bearing device including a disk-shaped bearing member and a race member. The bearing member has a tapered-land face on which tapered surfaces and flat-land surfaces are successively formed, along the peripheral direction. The race member is arranged to contact the tapered-land face of the bearing member.

6 Claims, 20 Drawing Figures

TAPERED-LAND THRUST BEARING DEVICE

BACKGROUND OF THE INVENTION

1. Field of the Invention

The present invention relates to a bearing device, more particularly to a tapered-land thrust bearing device.

2. Description of the Prior Art

A well-known conventional tapered-land thrust bearing comprises a flat disk-shaped bearing member, with tapered surfaces and flat-land surface successively on the bearing surface in the peripheral direction thereof or with oil grooves formed in a part of the tapered surface. Such a conventionally known tapered-land thrust bearing is made, for example, of cold rolled carbon steel (SPCC), according to G3141 of Japanese Industrial Standard, hereinafter referred to simply as "JIS", subjected to nitriding treatment for a bearing surface hardness of 450 to 500 Hv (Vickers' hardness).

Such a tapered-land thrust bearing is used, for example, in an automotive transmission. The rotating shaft or other member used together with the bearing, however, is generally machined relatively roughly. The rough contact surface of the shaft, etc., has an adverse effect on the performance of the tapered-land thrust bearing, decreasing the bearing load capacity, creating large frictional force upon startup, breaking the oil film and causing abrasive wear, and causing bearing seizure. These problem can be prevented by increasing the machining precision accuracy of the shaft, etc., however, this would entail considerable cost and is therefore not feasible in practice.

SUMMARY OF THE INVENTION

An object of the present invention is to provide a tapered-land thrust bearing device of low cost able to increase the load capacity without abrasive wear.

According to the present invention, there is provided a tapered-land thrust bearing device comprising a disk-shaped bearing member, having on at least one side a tapered-land face with tapered surfaces and flat-land surfaces successively along the peripheral direction thereof, and a race member, the thickness of which is 0.05 to 1.0 mm, having a face arranged to contact the tapered-land face of the disk-shaped bearing member. It is advantageous that the race member have a radial wall and a peripheral wall axially extending from the periphery of the radial wall to define a retainer for receiving the disk-shaped bearing member and have a retaining means integrally formed with the peripheral wall at the free end thereof to prevent the disk-shaped bearing member from falling away from the race member.

DESCRIPTION OF THE PREFERRED EMBODIMENTS

Referring now to FIGS. 1 through 5, a tapered-land thrust bearing device according to the present invention comprises a retainer-shaped race member 1 and a disk-shaped bearing member 3 received in the race member 1.

Figure 5:
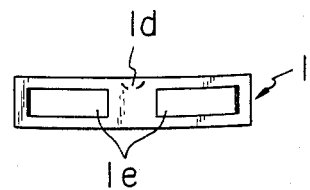
FIG. 5 is a side elevational view of the bearing device shown in FIG. 1.
Figure 6:
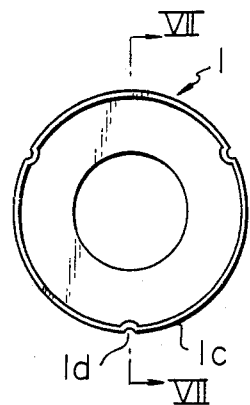
FIG. 6 is a plan view of a race member used in the present invention.
Figure 7:
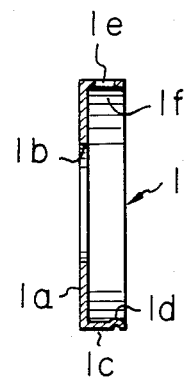
FIG. 7 is a cross-sectional view taken along a line VII—VII in FIG. 6.

As also illustrated in FIGS. 6 and 7, the race member 1 includes a disk-shaped radial wall 1a, having a central opening 1b, and a peripheral wall 1c axially extending from the periphery of the radial wall 1a. The race member 1 has several inner projections 1d at the free end of the peripheral wall 1c, thereby preventing the bearing member 3 from falling out. The projections 1d are formed integrally with the peripheral wall 1c. The race member 1 is made of high carbon chromium bearing steel (SUJ) (JIS G4805), carbon tool steel (SK) (JIS G4401), or the like and has a hardness of not less than 150 Hv (Vickers' hardness). The inner surface of the race member 1, especially the inner surface of the radial wall 1a, is smoothly machined so that the roughness thereof is, for instance, not more than 1 micrometer Rz (Rz:JIS). As illustrated in FIG. 5, the race member 1 is also provided with oil ports 1e in its peripheral wall 1c, for facilitating oil lubrication. For the same purpose, any means such as openings, windows, cut portions or the like, formed by punching or cutting, as well as drilling ports may be employed.

Figure 1:
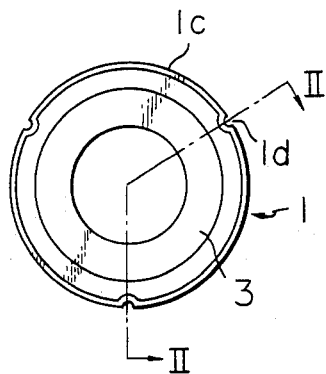
FIG. 1 is a plan view, seen from an arrow I in FIG. 2, of an embodiment of a tapered-land thrust bearing device according to the present invention.
Figure 3:
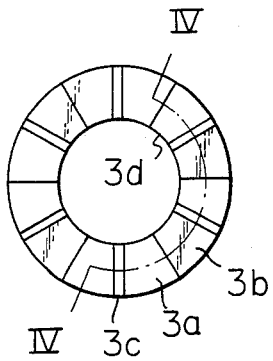
FIG. 3 is a bottom view of a tapered-land thrust bearing member seen from an arrow II-III in FIG. 2.
Figure 4:
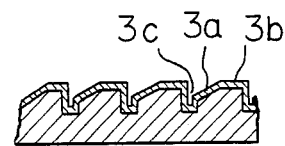
FIG. 4 is a cross-sectional view of a tapered-land surface taken along a line IV—IV FIG. 3.

The disk-shaped bearing member 3 also has a central opening 3d. The tapered-land bearing member 3 is formed with, on the face thereof facing opposite to the race member 1, a so-called "tapered-land face", which comprises tapered surface 3a, flat-land surfaces 3b, and oil groove 3c along the peripheral direction of the bearing member 3, as illustrated in FIGS. 3 and 4. The tapered-land face is nitrided over 10 micrometer thickness for a hardness of, for instance, 450 Hv.

Figure 2:
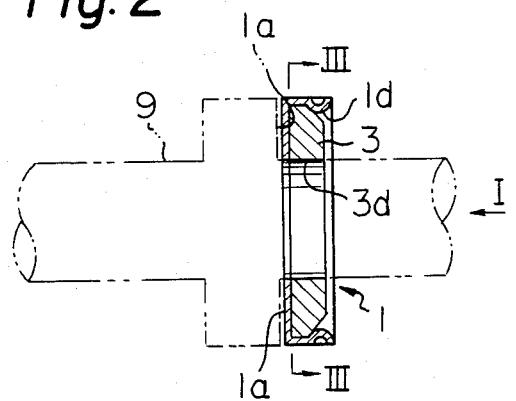
FIG. 2 is a cross-sectional view taken along a line II—II in FIG. 1.

As illustrated in FIG. 2, a shaft 9 is supported on the tapered-land thrust bearing device of the present invention so that a flange portion 9a comes into contact with the radial wall 1a of the race member 1.

Figure 17:
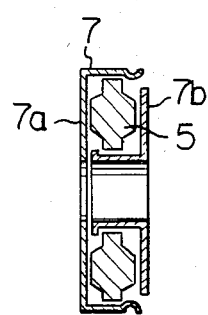
FIG. 17 is a cross-sectional view of still another embodiment of a bearing device used for a reversible shaft.
Figure 20:
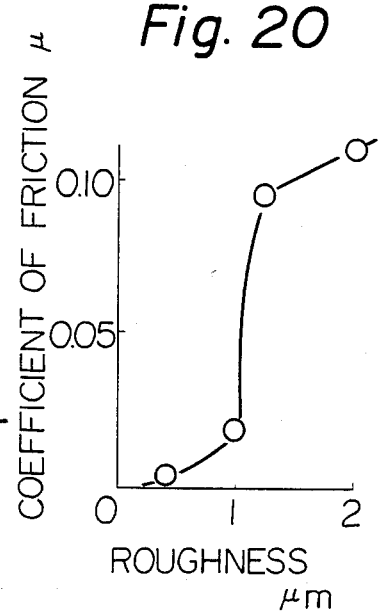
FIG. 20 is a diagram of the relationship between the coefficient of friction and roughness of a shaft.

Using a friction and wear-out test machine, a tapered-land thrust bearing device according to the above-mentioned embodiment was examined to determine the relationship between the thickness of the race member 1 and seizure face pressure the relationship between roughness of a shaft 9a (FIG. 2) contacting the race member 3 and seizure face pressure (the result of which is illustrated in FIG. 17), and the relationship between roughness of the shaft and coefficient of friction (the results of which are illustrated in FIG. 20). In this test, the shaft rotating speed was 1850 rpm.

Lubrication oil of a temperature of 100° C., was supplied under internal forced feed lubrication at a flow of 0.1 kg/cm. The tapered-land thrust bearing member 3 used in this test was made of cold rolled carbon steel (SPCC) (JIS G3141) and had a thickness of 2 mm. The tapered-land face thereof was subjected to chloride bathing nitriding treatment over 10 to 15 micrometer. The inner diameter of the bearing member was 30.1 mm and the outer diameter thereof was 46.5 mm. On the other hand, the race member 1 used in the test was made of carbon tool steel (SK-5) (JIS 4401) and had an inner diameter of 30 mm, and an outer diameter of 47 mm.

Figure 18:
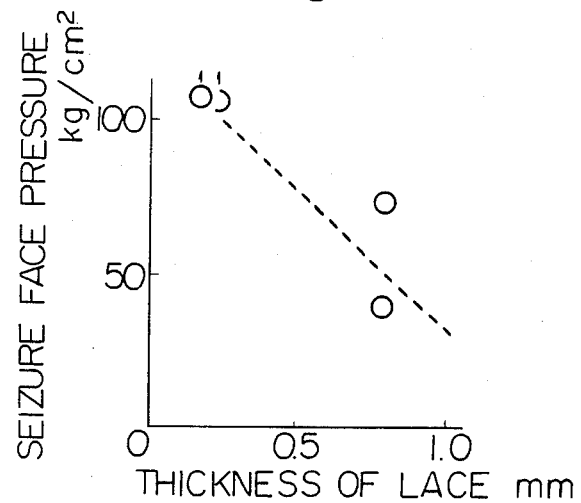
FIG. 18 is a diagram of the relationship between seizure face pressure and thickness of a race member.

It will be understood from FIG. 18 that the seizure face pressure is influenced by the thickness of the race member. While depending somewhat on usage conditions, use of a race member having its thickness of not more than 1.0 mm, preferably 0.5 mm to 0.8 mm, is favorable. It is believed that seizure characteristics due to the perpendicularity or undulation of the race surface are reduced due to the decreased thickness of the race member and the resultant drop in deformation resistance of the race member and improved contact between the race member and the bearing member. If the race member is too thick, it readily seizes due to large deformation resistance. On the other hand, if the race member is too thin, i.e., is less than 0.05 mm, it may crack.

Figure 19:
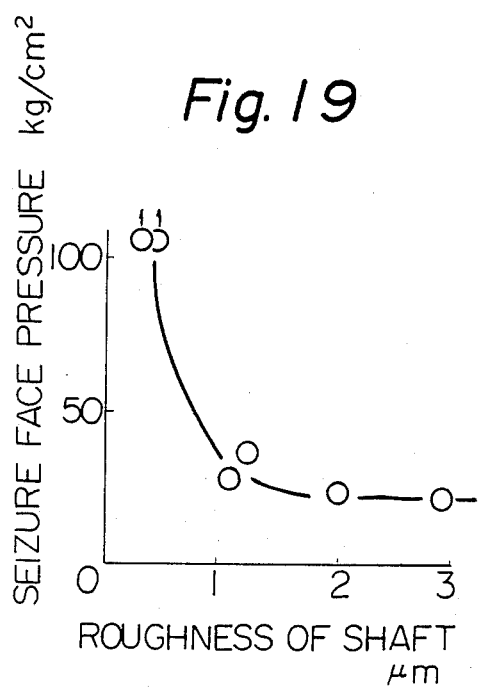
FIG. 19 is a diagram of the relationship between seizure face pressure and roughness of a shaft.

As understood from FIG. 19, the seizure face pressure varies significantly in accordance with the roughness of the shaft contacting the race member. Even improving the roughness precision of the shaft surface to increase the seizure face pressure has its limits, since conventional machining can usually only achieve a precision of 1.5 micron Rz (Rz:JIS). Greater precision would entail significantly increased cost and would still not enable a tapered-land bearing to exhibit its full performance. According to the present invention, however, due to the combination of a tapered-land thrust bearing member and a thin walled race member, a tapered-land bearing device with a high seizure face pressure can be obtained by improving the roughness accuracy of the race member.

By way of reference, in FIGS. 18 and 19, the load on the bearing member was gradually increased by 10 kg every 20 minutes. The load values cleared were plotted.

Next, the coefficient of friction ($\mu$) was calculated on the basis of the frictional force (F) and the load (W) measured under the experimental condition mentioned above. The coefficient of friction expressed by $\mu = F/W$ is graphically shown in FIG. 20. It will be understood from FIG. 20 that a roughness of the shaft, i.e., the race member, of 1 micron Rz (Rz:JIS) a sharp decline on or less results in a sharp decline in the coefficient friction. The reason is that the tapered surface 3a and the flat-land surface 3b of the tapered land thrust bearing member 3 allow full oil film forming effect in the clearance between the bearing member 3 and the race member 1.

Referring now to FIGS. 6 and 7, an embodiment of the race member 1 is illustrated wherein the race member 1 comprises a peripheral wall 1c having inner projections 1d, as mentioned above, and a hollow recess is defined within the peripheral wall 1c.

Figure 8:
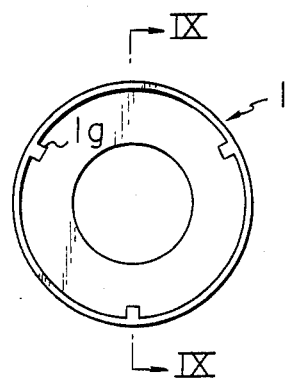
FIG. 8 is a plan view of a race member of another embodiment.
Figure 9:
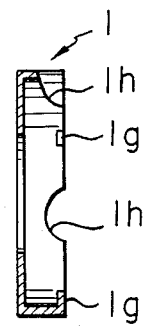
FIG. 9 is a cross-sectional view taken along a line IX—IX in FIG. 8.
Figure 10:
FIG. 10 is a side elevational view of the race member shown in FIG. 8.

In FIGS. 8, 9, and 10, another embodiment of the race member 1 is illustrated, wherein several bent notches 1g and cut portions 1b are alternately formed at the free end of the peripheral wall 1c of the race member 1. The cut portions 1h serve for oil communication.

Figure 11:
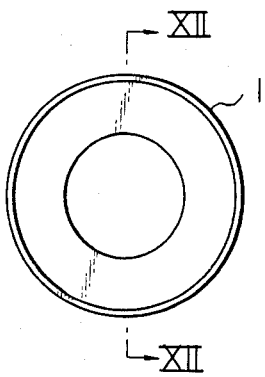
FIG. 11 is a plan view of a race member of still another embodiment.
Figure 12:
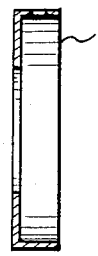
FIG. 12 is a cross-sectional view taken along a line XII—XII in FIG. 11.

In FIGS. 11 and 12, the simplest embodiment of the race member 1 is illustrated, wherein the race member 1 has a simple retainer shape.

Figure 13:
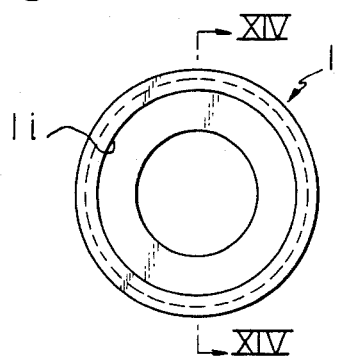
FIG. 13 is a plan view of a race member of a further embodiment.
Figure 14:
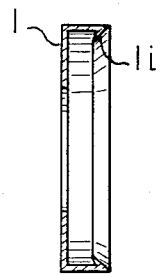
FIG. 14 is a cross-sectional view taken along a line XIV—XIV in FIG. 13.

In an embodiment illustrated in FIGS. 13 and 14, a uniformly, inward folded end portion 1i is formed in the peripheral direction at the free end of the peripheral wall to prevent the tapered-land thrust bearing member (not shown in these figures) from falling out.

Figure 15:
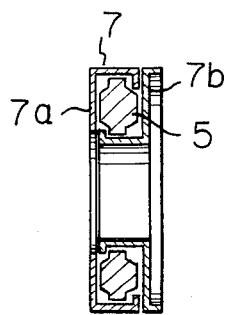
FIG. 15 is a cross-sectional view of an embodiment of a taper-land thrust bearing device, used for a reversible shaft, according to the present invention.
Figure 16:
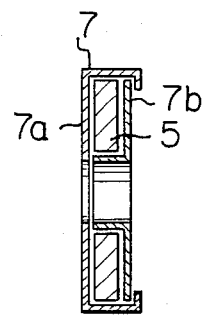
FIG. 16 is a cross-sectional view of another embodiment of a bearing device used for a reversible shaft.

FIGS. 15 through 17 illustrate embodiments of the tapered-land thrust bearing device, according to the present invention, adapted for reversible rotation of the shaft. In these embodiments, each thrust bearing member 5 is provided with tapered surfaces, flat-land surfaces, and oil grooves, such as illustrated in FIGS. 3 and 4, at both sides thereof, the direction of the tapered surfaces being opposite for each side, whereby either side of the tapered-land surfaces operates as a "tapered-land face" depending of the rotational direction of the shaft. On the other hand, a race member 7 comprises two members 7a and 7b so as to support the bearing member 5 from the two sides thereof.

As mentioned hereinabove, according to the present invention, the tapered-land thrust bearing device is formed by combining a tapered-land thrust bearing member with a race member. Therefore, an improved tapered land thrust bearing device can be obtained, wherein the surface roughness accuracy of the race member can be sufficiently increased and a large load capacity can be achieved with less abrasive seizure wear-out and other seizure.

We claim:

1. A tapered-land thrust bearing device adapted to be disposed between two members rotating relatively to each other and to bear a thrust force exerted by said relative rotation members, said thrust bearing device comprising:
 a disk-shaped bearing member adapted to be engaged with one of said relative rotation members and having a tapered-land face on at least one side, said tapered-land face comprising tapered surfaces and flat-land surfaces successively formed along the peripheral direction thereof; and
 a race member comprising a radially extending wall having a face which is adapted to be engaged with the other relative rotation member and an opposite-side face arranged to contact said tapered-land face of said disk-shaped bearing member by the thrust face to define a sliding surface therebetween, a peripheral wall axially extending from the periphery of said radially extending wall to define a retainer for receiving said disk-shaped bearing member, and retaining means integrally formed with said peripheral wall at a free end thereof for preventing said disk-shaped bearing member from falling away from said race member.

2. A device as set forth in claim 1, wherein said retaining means comprises several projections each projecting inwardly from said peripheral wall.

3. A device as set forth in claim 1, wherein said retaining means comprises several notches each bent inwardly from said peripheral wall.

4. A device as set forth in claim 1, wherein said retaining means comprises an end portion uniformly inward folded at the free end of said peripheral wall.

5. A device as set forth in claim 1, wherein said race member has oil communicating ports in said peripheral wall thereof.

6. A tapered-land thrust bearing device adapted to be disposed between two members rotating relatively to each other and to bear a thrust force exerted by said relative rotation members, said thrust bearing device comprising:

a disk-shaped bearing member adapted to be engaged with one of said relative rotation members and having a tapered-land face on at least one side, said tapered-land face comprising tapered surfaces and flat-land surfaces successively formed along the pheripheral direction thereof; and a race member comprising a radially extending wall having a thickness of 0.05 to 1.0 mm and having a face which is adapted to be engaged with the other relative rotation member and an opposite-side face arranged to contact said tapered-land face of said disk-shaped bearing member by the thrust face to define a sliding surface therebetween.

* * * * *